United States Patent [19]

Roe

[11] 3,973,385
[45] Aug. 10, 1976

[54] ELECTROMECHANICAL CABLE
[75] Inventor: Norman P. Roe, Idyllwild, Calif.
[73] Assignee: Consolidated Products Corporation, Idyllwild, Calif.
[22] Filed: May 5, 1975
[21] Appl. No.: 574,611

[52] U.S. Cl.................................. 57/144; 57/148; 174/113 R; 174/128 R
[51] Int. Cl.².................. D07B 1/10; H01B 7/00
[58] Field of Search............ 57/139, 144, 145, 146, 57/147, 148, 160, 161, 166; 174/108, 113 R, 128 R, 130

[56] References Cited
UNITED STATES PATENTS

| | | | |
|---|---|---|---|
| 1,334,257 | 3/1920 | Partington | 57/148 X |
| 3,307,343 | 3/1967 | Gilmore | 57/145 X |
| 3,730,966 | 5/1973 | Aupoix et al. | 174/113 R X |
| 3,760,093 | 9/1973 | Pemberton | 174/128 R |

Primary Examiner—Donald E. Watkins

[57] ABSTRACT

An electromechanical cable having individually jacketed non-metallic strain members.

4 Claims, 7 Drawing Figures

ELECTROMECHANICAL CABLE

BACKGROUND OF THE INVENTION

Numerous factors enter into the manufacture of electromechanical cable, including electrical conducting capability, effectiveness of the electrical insulation, size of the cable, strength of the cable, weight, cost, response to bending action, response to twisting action, response to longitudinal mechanical load, and the like. The present invention is directed to cable which is light in weight relative to its mechanical strength. Light weight is particularly important where the cable is to be deployed for long vertical distances and must support its own weight.

It is, therefore, an object of the invention to provide an electromechanical cable which is high in mechanical strength but low in weight.

Another object of the invention is to provide a new and unique component part for an electromechanical cable, namely, a composite strain member.

SUMMARY OF THE INVENTION

According to the invention an individually jacketed non-metallic strain member is used in an electromechanical cable in place of the conventional metallic type of strain member. The jacket is preferably made of a formable plastic material, and the strain bearing portion of the composite strain member is preferably a bundle of yarns or fibers of aramid or the like, such as Kevlar, or any of the similar or equivalent materials described in copending application Ser. No. 524,665, filed Nov. 14, 1974, which is assigned to the same assignee as the present application. The function of the jacket is to establish a lateral position within the cable structure of the strain bearing portion of the composite strain member; and the function of the strain bearing portion is to carry the longitudinal stress. The invention provides for a longitudinal sliding movement of the strain bearing portion within the jacket. In order to permit this longitudinal sliding movement to occur when and as needed, it is essential that either the strain bearing portion of the composite member (i.e., yarns or fibers) has a very slick external surface, or else it is necessary that the bundle of fibers or the like be lubricated at the external surface of the bundle.

DRAWING SUMMARY

PREFERRED EMBODIMENT (FIGS. 3 to 6)

Reference is now made to FIGS. 3 to 6, inclusive, illustrating the presently preferred embodiment of the invention.

Figure 3:
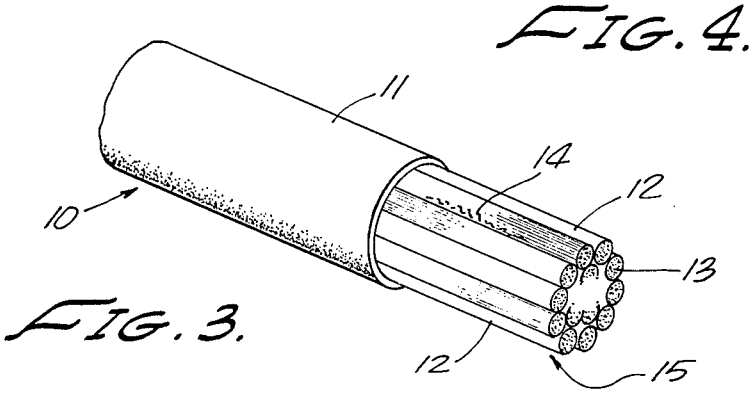
FIG. 3 is a perspective view, partially cut away, of a composite strain member in accordance with the invention.

FIG. 3 shows a composite strain member 10 which includes a plurality of fiber bundles 12 arranged in side-by-side relationship. Each fiber bundle contains several dozen or more relatively thin fibers of high tensile strength, such as aramid or the like. Individual fibers, while not clearly shown in FIG. 3, are designated by numeral 13. The plurality of fiber bundles 12 are arranged to form a substantially solid strain bearing structure 15 having a generally circular cross-sectional configuration. Lubricant material 14 is placed on the outer circumferential surface of the strain bearing structure. A cylindrical jacket 11 encompasses both the strain bearing structure 15 and the lubricant material thereon. Jacket 11 is a relatively thin layer of plastic material, such as high density polyethylene, which is rather easily deformable in shape.

Figure 6:
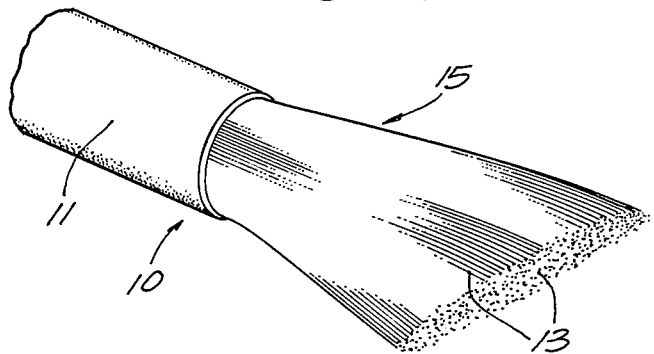
FIG. 6 is another perspective view of the composite strain member of FIG. 3.

As shown in FIG. 6, the bundles 12 tend to merge together and become indistinguishable, forming a single bundle 15.

Figure 4:
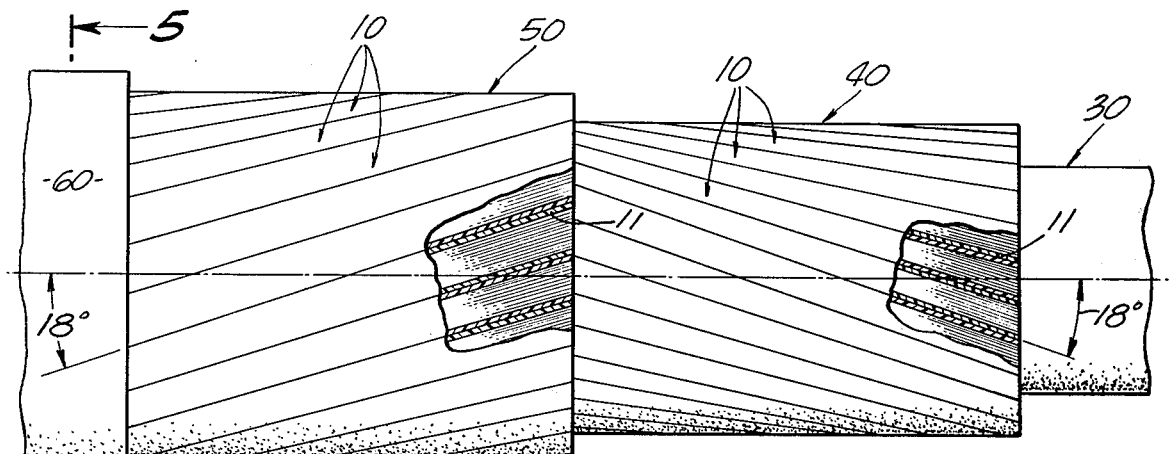
FIG. 4 is a side view, partially cut away, of a complete electromechanical cable in accordance with the invention.
Figure 5:
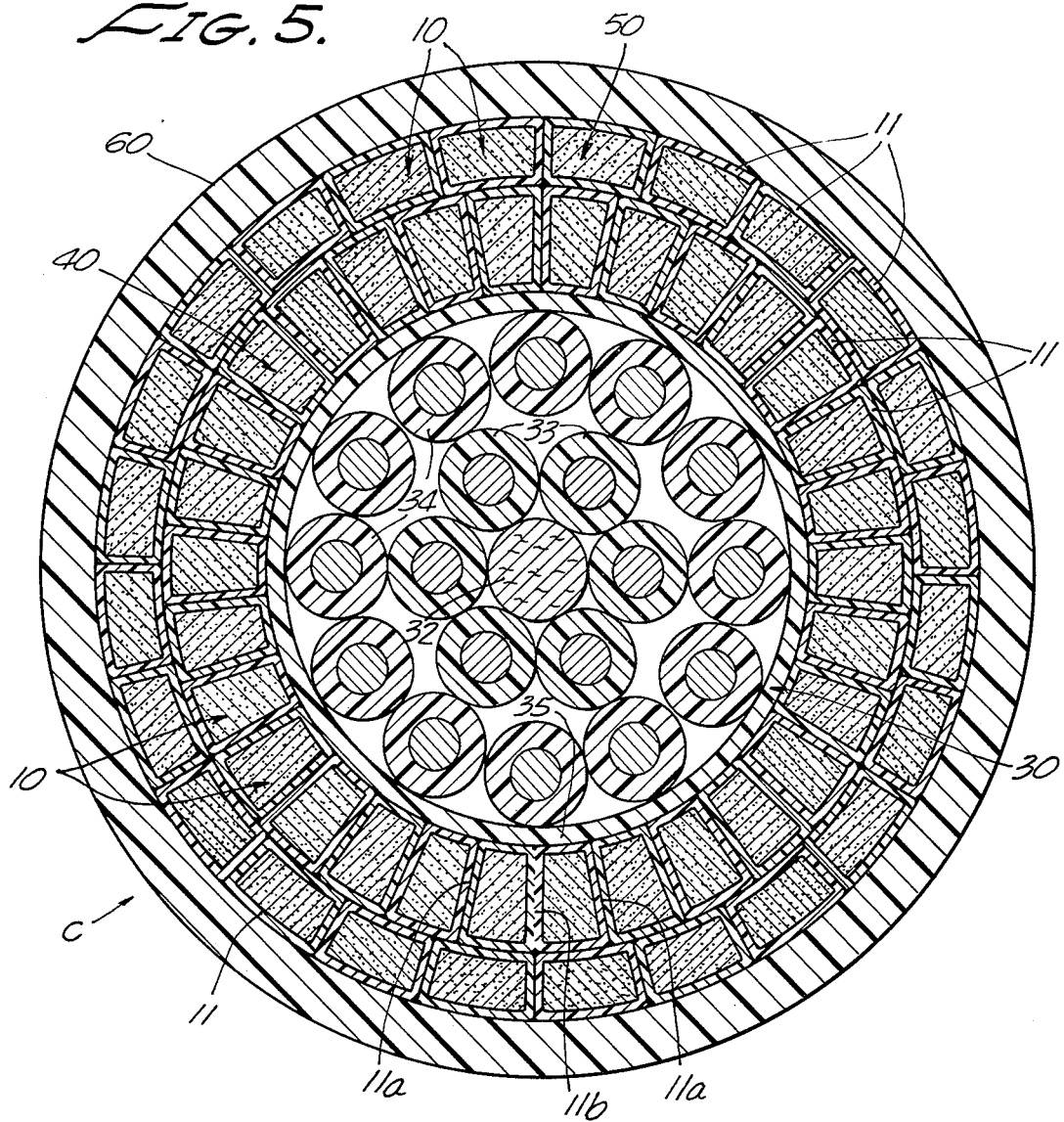
FIG. 5 is a transverse cross-sectional view, greatly enlarged, of the electromechanical cable taken on line 5—5 of FIG. 4.

FIGS. 4 and 5 show an electromechanical cable which incorporates fifty-four of the composite strain members 10 as shown in FIG. 3. The complete cable C includes an electrical core 30, an inner circumferential layer 40 of composite strain members, an outer circumferential layer 50 of composite strain members, and an external jacket 60.

While electrical core 30 may be of any desired construction, in the particular illustration it includes an electrically inert centerpiece 32 made of jute or the like, surrounded by a set of six individually insulated conductor wires 33, which in turn are surrounded by a set of twelve individually insulated conductor wires 34, the entire assembly then being housed within a plastic jacket 35. In the particular illustration the conductors 33 and 34 are of identical construction. The electrical core 30 may if desired, however, contain a single electrical conductor or a single pair of conductors, or a coaxial cable, or such other electrical conductors as may be desired.

The inner layer 40 of composite strain members includes thirty such members which are arranged circumferentially about the electrical core 30. Each strain member in the layer 40 has a generally rectangular configuration, with its longer dimension being radially disposed, but being somewhat thicker on its radially outer edge than on its radially inner edge. The composite strain members 40 are circumferentially packed together in relatively tight relationship, and in each strain member the corners of the jacket 11 are only slightly rounded.

The outer layer 50 of composite strain members includes only twenty-four such members. Each strain member in layer 50 is substantially rectangular in configuration but with its long dimension being disposed circumferential to the cable structure. The radially inner wall of each jacket 11 is somewhat concavely curved while the radially outer wall of each jacket is somewhat convexly curved. The strain members in layer 50 are circumferentially packed together in relatively tight relationship. The four corners of each jacket 11 are only slightly rounded.

As best seen in FIG. 4, the outer circumferential layer 50 of strain members are helically twisted to the left at an angle of about 18 degrees, while the inner circumferential layer 40 of strain members are helically twisted to the right at an angle of about 18 degrees. Thus, when longitudinal mechanical load is imposed upon the cable, the two circumferential layers of strain members develop torque forces in opposing direction. The average radius distance of the strain members 50 from the longitudinal axis of the cable, i.e., the longitudinal axis of the inert centerpiece 32, is preferably about five-fourths the average radial distance of the inner strain members 30. But there are only four-fifths as many of the strain members 50. Therefore, the two layers of strain members are in essentially a torque-balanced relationship.

Figure 1:
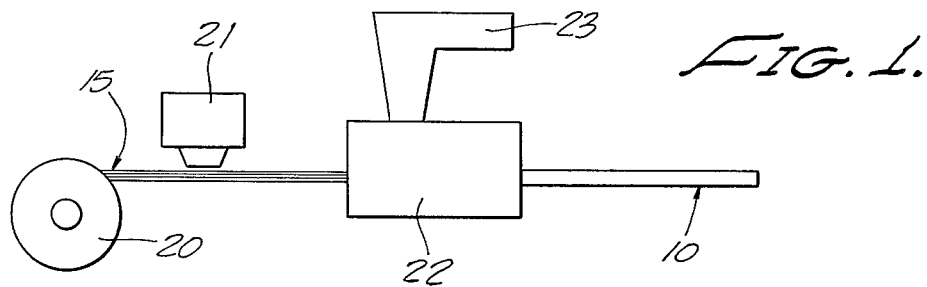
FIG. 1 is a schematic view of apparatus for making a composite strain member.
Figure 2:
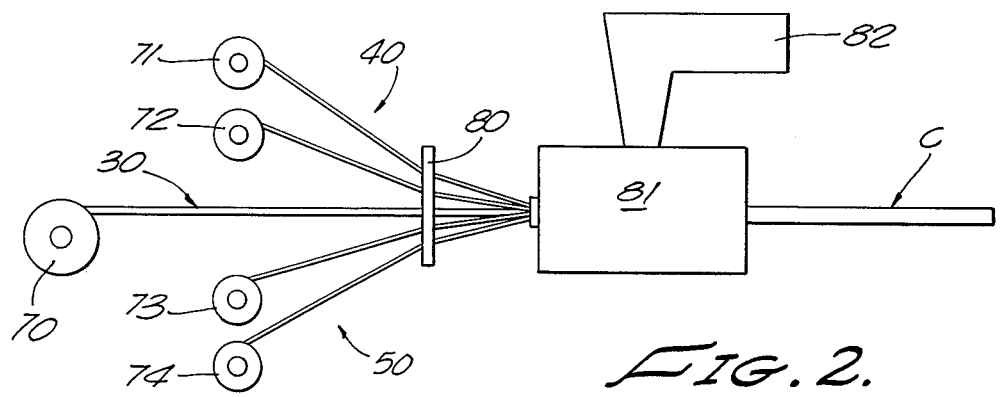
FIG. 2 is a schematic view of apparatus for making a complete cable structure.

METHOD OF MAKING (FIGS. 1 and 2)

Figure 7:
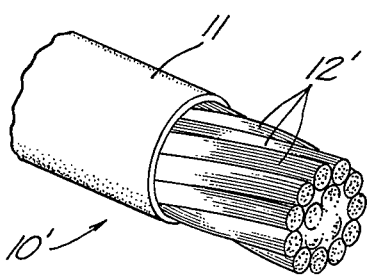
FIG. 7 is a perspective view of a modified form of the composite strain member.

FIG. 1 illustrates schematically the method of making strain member 10 of FIGS. 3 and 7 while FIG. 2 illustrates schematically the method of making the complete electromechanical cable.

As shown in FIG. 1 the fiber bundle 15 is unreeled from a drum 20 and pulled towards an extruder 22. Lubricant applicator 21 applies lubricant to the external surface of the fiber bundle before it reaches the extruder. An infeed device 23 supplies hot plastic material to the extruder. The complete composite strain member 10 is pulled from the extruder 22.

It will be understood that in the event the non-metallic strain member materials are extremely slippery and have an extremely low coefficient of friction, then the separate step of applying a lubricant material to the external surface of the bundle may be omitted. It is essential, however, that in the composite strain member 10 as shown in FIG. 3 the internal strain bearing portion of the member be free to slide longitudinally within the plastic jacket 11.

FIG. 2 illustrates schematically the method of making the cable C of FIGS. 4 and 5. A conducting core 30 is unrolled from a drum 70 and fed to an extruder 81. A forming die 80 guides the electrical core 30 toward the extruder, and also guides and forms both the inner layer 40 of composite strain members and the outer layer 50 of composite strain members. By way of example only, and not as a complete illustration, spools 71 and 72 are shown as feeding individual ones of the strain members 40 toward the forming die 80. As a further example, spools 73 and 74 are shown as feeding individual ones of the strain members 50 toward the forming die 80. It will be appreciated that each individual strain member as it leaves its feed spool is still of the generally circular configuration that it had when initially manufactured, i.e., as shown in FIGS. 3 and 7. When it enters the forming die 80, however, its cross-sectional configuration is changed to substantially that of a rectangle so that it will fit into its proper place in the completed cable C. More specifically, the composite strain members forming the inner layer 40 are each formed into a rectangle whose long dimension is disposed radially relative to the cable core, while those strain members that will constitute the outer layer 50 are each formed into a rectangle whose long dimension is disposed circumferentially of the cable core. All of the necessary strain members, together with the electrical core 30, are guided into the extruder 81. A plastic feeding device 82 feeds hot plastic material into the extruder. The completed cable C is pulled from the output side of the extruder.

OPERATION

Longitudinal sliding movement of the fibers permits equalizing tensile stress loads between the various strain members, and also between the various fibers within a particular strain member. The sliding movements may result from bending, twisting, a change in longitudinal stress load, or a combination thereof.

ALTERNATE FORMS

In the completed cable it may be preferred to permit the jackets 11 of the various composite strain members to remain in a relatively loose relationship with each other. Individual jackets may then shift their positions somewhat, in either radial, circumferential, or longitudinal directions, or some combination thereof. Alternatively, however, it may be preferred to fix the positions of the plastic jackets. This may, for example, be achieved by passing all of the composite strain members under a bank of infra red heaters, after they have passed through the forming die and before they merge together in the completed cable. Adjacent jacket portions will then become somewhat molten and will fuse together as a single mass. For example, as shown in the lower portion of FIG. 5 two of the jackets 11a have been modified by heating their adjacent wall portions, with the result that the two wall portions are fused into a single wall structure 11b. It will be appreciated that by use of appropriate techniques all of the strain member jackets in each circumferential layer may be fused together, and additionally, if desired, the inner and outer layers of jackets may be fused together at their adjoining surfaces.

FIG. 7 illustrates a modified form 10' of the composite strain member. As shown in FIG. 7 the fiber bundles 12' are themselves helically twisted, but still form a substantially solid mass of generally circular cross-sectional configuration. The bundles of fibers are retained by the plastic jacket 11, as previously.

It will be understood that while lubricant material is not specifically shown in FIGS. 6 and 7, it is nevertheless utilized when necessary. If the fibers or other non-metallic members have an extremely slick surface, then the separate application of lubricant material may be omitted. It is, however, essential that in the completed composite strain member the internal strain-bearing portion be free to slide longitudinally within the deformable jacket 11.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:
1. An electromechanical cable comprising:
a plurality of strain members arranged in inner and outer circumferential layers, the members in said two layers being helically twisted in mutually opposite directions;
said strain members being of substantially rectangular cross-sectional configuration, the members in said inner layer being arranged with their larger dimension extending radially, and the members in said outer layer being arranged with their larger dimension extending circumferentially, whereby said two layers are substantially torque balanced.

2. An electromechanical cable comprising:
a plurality of strain members arranged in inner and outer circumferential layers, the members in said two layers being helically twisted in mutually opposite directions;
said strain members being of substantially rectangular cross-sectional configuration, the members in said inner layer being arranged with their larger dimension extending radially, and the members in said outer layer being arranged with their larger dimension extending circumferentially, whereby said two layers are substantially torque balanced;
wherein each of said strain members is formed from a bundle of fibers of high tensile strength and a plastic jacket which encases said bundle.

3. An electromechanical cable comprising:
a plurality of strain members arranged in inner and outer circumferential layers, the members in said two layers being helically twisted in mutual opposite directions;
said strain members being of substantially rectangular cross-sectional configuration, the members in said inner layer being arranged with their larger dimension extending radially, and the members in said outer layer being arranged with their larger dimension extending circumferentially, whereby said two layers are substantially torque balanced;
wherein each of said strain members is formed from a bundle of fibers of high tensile strength and a plastic jacket which encases said bundle, and wherein said bundle of fibers are longitudinally slidable within said jacket.

4. An electromechanical cable comprising:
a plurality of strain members arranged in inner and outer circumferential layers, the members in said two layers being helically twisted in mutually opposite directions;
said strain members being of substantially rectangular cross-sectional configuration, the members in said inner layer being arranged with their larger dimension extending radially, and the members in said outer layer being arranged with their larger dimension extending circumferentially, whereby said two layers are substantially torque balanced;
the product of the number of strain members in said outer layer times their average radial distance from the axis of the cable being substantially equal to the product of the number of strain members in said inner layer times their average radial distance from the axis of the cable.

* * * * *